June 24, 1941. A. J. CORDREY 2,246,780
SPONGE RUBBER PROCESS
Filed April 25, 1939
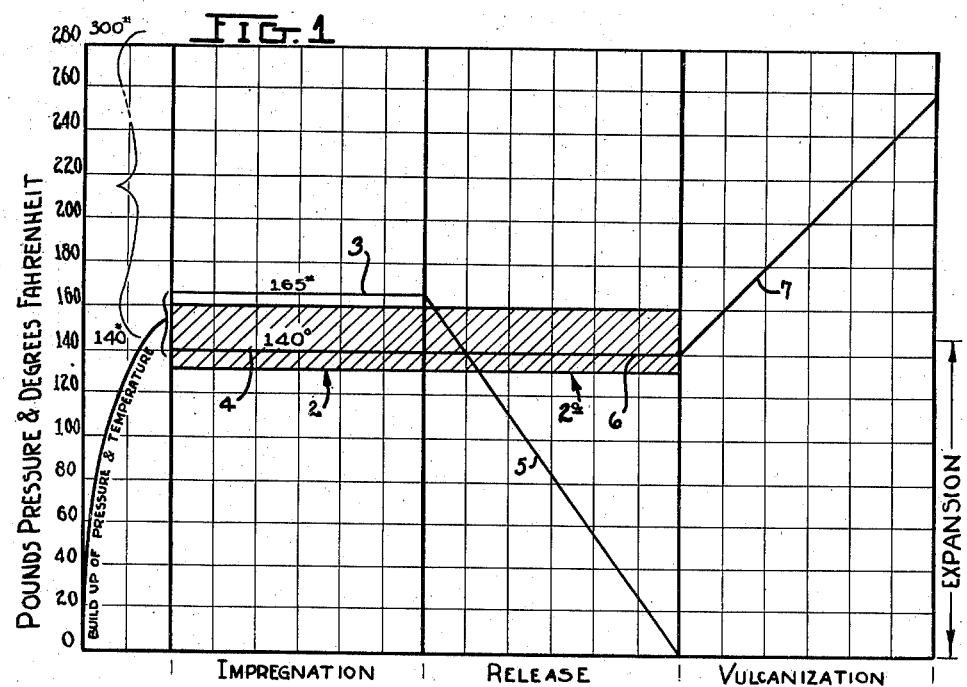
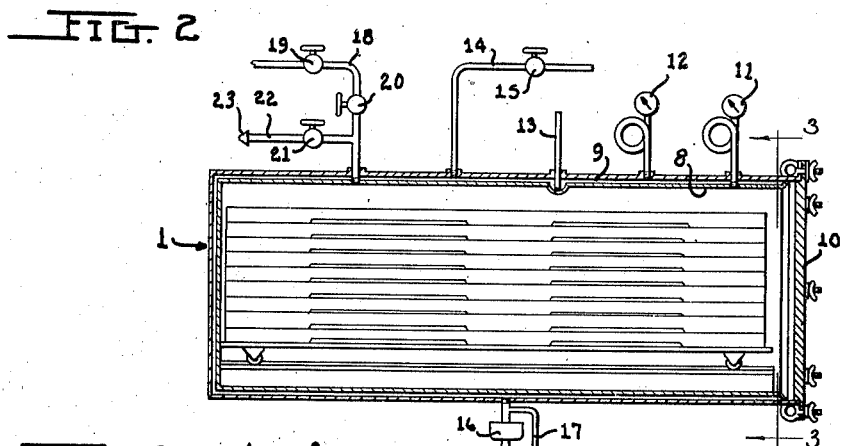
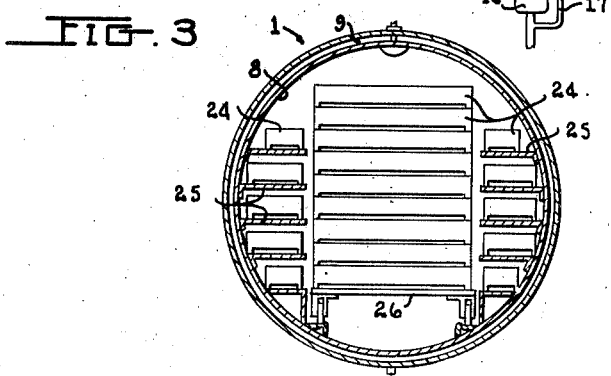
Inventor
ALMON J. CORDREY
by Toulmin & Toulmin
Attorneys Patented June 24, 1941

2,246,780

UNITED STATES PATENT OFFICE 2,246,780

SPONGE RUBBER PROCESS

Almon J. Cordrey, Chicago, Ill., assignor to Industrial Process Corporation, Dayton, Ohio, a corporation of New York Application April 25, 1939, Serial No. 269,955

6 Claims. (Cl. 260—725)

The object of my invention is to provide a method of sponging rubber or similar materials.

It is the object of my invention to provide a method of sponging rubber which will produce uniform sponge under a commercial production system and a method that is not highly critical as to temperature control.

It is a further object to provide a method which is capable of utilizing low gas pressures, which secures a uniform and controlled expansion of the stock, and which results in thoroughly blown stock of substantially uniform size of bubbles in the stock.

It is a further object to provide a method in which the temperature is maintained constant or not exceeding a given temperature during the time of forming the cell structure between the impregnation and vulcanization stages while the gas is being released from maximum pressure to zero.

It is an object to provide a method which utilizes stock of low plasticity as compared with that heretofore used in the art.

It is a further object to eliminate difficulties heretofore experienced in the art with highly critical temperature control where the method was followed of increasing the temperature while the gas was being released as it was difficult to duplicate results under certain conditions due to the fact that the increase of temperature had to be accurately timed so that the vulcanization would start coincident with the maximum release of gas and the temperature would not increase too rapidly, setting up the stock prior to maximum expansion.

By my invention, by having a constant temperature or a temperature not exceeding the maximum amount during the release period, it is possible to get duplicate results in commercial practice by bringing about the maximum expansion through the complete release of the gas substantially to zero under uniform temperature conditions, and thereafter, having accomplished an expansion while maintaining the temperature of the stock substantially constant to secure the optimum expansion conditions, then the temperature is raised and vulcanization takes place. By eliminating the increase of temperature during the release period, I have discovered that under many commercial conditions, all the problems of rapid commercial production of duplicate sponge articles are eliminated.

It is the object of this invention to provide a process which passes through four stages: the preliminary build-up of pressure and temperature; impregnation of the stock with gas-controlled temperature of the stock; release of the gas from maximum to substantially zero while the expansion of the stock takes place with the stock maintained at a substantially constant temperature; and the vulcanization period during which the temperature is raised to vulcanization temperature while the stock is held in its expanded condition.

Referring to the drawing:

Figure 1 is a diagrammatic illustration of a typical range of temperatures and pressures illustrating the application of this process to a stock of approximately the plasticity of 70. It will be understood that this diagram is only illustrative that a wide variety of temperatures and pressures may be employed, depending upon the nature of the stock, the gas employed, etc.

Figure 2 is a vertical section through a diagrammatic heater or autoclave in which the sponging takes place. A rack for containing molds is shown in position.

Figure 3 is a section on the line 3—3 of Figure 2 looking in the direction of the arrows.

Heretofore the practice has been after impregnation to raise continuously the temperature during the gas release period so that the temperature of the stock increased as the gas was released, bringing the final set-up of the stock at the time the gas was released sufficiently to bring about the percentage of expansion desired. Under many conditions, this was found difficult when endeavoring to duplicate runs of sponge stock because of the variation inherent in stock and the extreme accuracy required of having the temperature set the stock at the instant the maximum release of gas had been accomplished. Furthermore, due to the fact that the stock was progressively getting harder or tougher as the temperature increased as the gas pressure was becoming progressively weaker or less, the undesirable condition arose of having the stock harder to expand and sponge at the time the gas pressure was decreasing. The full expansion also takes place first before the stock reaches a semi-liquid stage (160 degrees F. to 185 degrees F.) where the stock is too soft to expand without cell rupture, and second, before it (later on) begins to set up and become too stiff to take its expansions (185 degrees F. to 210 degrees F.).

The instant invention corrects these difficulties as follows. I have found that by maintaining the temperature of the stock constant during the period of gas release and the expansion of the stock and by not permitting that temperature to rise so high as to bring about any "set" or vulcanization of the stock or progressive stiffening of the stock or before the stock becomes too soft to take expansion, I am enabled to get uniform sponging irrespective of variations in the stock and irrespective of any variations in the temperature during the release period as substantially constant. Thereafter, maximum expansion having taken place in a stock of uniform plasticity due to uniform temperature, the uniformly sponged stock can be heated to vulcanization temperature and so vulcanized.

Referring to a typical example of this process, as illustrated in Figure 1, if the autoclave has not been heated, there is a preliminary period during which the temperature is raised as rapidly as possible. Whether or not it has been heated, the gas is admitted after the stock has been loaded into the autoclave 1 as rapidly as possible. The exact pressure of the gas depends upon the nature of the stock such as its plasticity, formula, etc., the temperatures to be employed and the period during which the temperatures are to be employed, for it is obvious that by using a longer period of time, it is possible to use a lower temperature in order to bring the stock up to a given temperature.

Starting with the temperature brought up to the desired level and the pressure likewise being brought up to the desired level, we begin the impregnation period. The pressure can vary from 140 pounds to 300 pounds, or even above, but I prefer with stock having plasticity of about 70 to use gas pressure of about 165 pounds. A variety of gases may be employed but I prefer carbon dioxide gas. Chemical stock also may be employed or either carbon dioxide gas or solid carbon dioxide may be used. In such an example I prefer a temperature from 130 to 160 degrees Fahrenheit, preferably in the neighborhood of 140 degrees. I have indicated by the hatch lines in Figure 1 as at 2 and 2a the general area in which the temperature may vary, but prefer that any temperature selected within that area be maintained substantially constant, both during the impregnation and release periods.

Rubber stock will impregnate with gas at quite a range of temperatures and there is no reason to believe that stock will not impregnate as quickly or quicker at 90 degrees as at any temperature higher than this—so, the temperature is not raised and held at 130 degree to 160 degree levels for the purpose of impregnation, but to obtain the most desirable consistency of the stock for expansion after impregnation, and also temperature equalization of the stock. We found this point of "most desirable consistency" to be from 130 degrees to 160 degrees.

When the stock has become impregnated with the gas and has been brought up to the suitable temperature both for impregnation and for maintaining it at the desired plasticity during the release period, the gas is then released from its maximum pressure of approximately 165 pounds (in this illustration) to substantially zero. It is true that the stock impregnates as quickly and thoroughly at lower temperatures, but time can be saved which is lost in cooling and then reheating the autoclave below 130 degrees to 160 degrees temperature. The advantage of having a longer temperature equalization is the reason for impregnating at these elevated temperatures. The rate of release is not vital, but it is customarily substantially constant and should be slow. It should be about 15 minutes on commonly used compounds. But it is essential that the temperature during the release period not exceed a constant temperature. It is preferred that the temperature should be the same as that during the impregnation period, or possibly somewhat less, but preferably substantially not above that temperature.

By having this arrangement, it is unnecessary to increase the temperature as the pressure decreases in order to have the exact plasticity of the stock and the expansion secured at the moment that vulcanization sets in. The pressure line on this chart is designated 3. The temperature line is designated 4 during the impregnation period. The pressure line descends during the release period as at 5 while the temperature line during the release period at 6 maintains a constant level. During this release period, the stock being maintained at a constant plasticity, the temperature must not be so low as to allow the stock to lose its plasticity and must not be so high as to let it lose its body so that it will not contain the gas bubbles and is released.

The plasticity of the stock must be regulated by the temperature range so as to secure during the period of release of the gas the maximum expansion of the gas bubbles in the stock without the gas escaping from the stock or the bubbles breaking into one another; if the temperature is too high, the stock is so soft that the bubbles break into one another, and if the stock is too rigid due to the temperature being too low, then the gas will seep out of the stock because it is not strong enough to expand the stiff stock by the gas in the bubbles. If the low temperature of the stock makes it so stiff that it sets up too great a resistance to bubble expansion, then the gas will penetrate and leak through the stock rather than be used to expand the stock.

Upon the accomplishment of the foregoing, then the temperature is raised as indicated by the line 7 to vulcanization temperature and held long enough to bring about vulcanization.

The mechanism for performing these steps of the process may be of any desired character. I have illustrated in Figures 2 and 3 one typical form of apparatus such as the autoclave 1, which is provided with an interior shell 8 to form a steam jacket 9 that serves to heat the contents of the autoclave. The end of the autoclave is closed by a door 10. Gas pressure within the autoclave is indicated by the gauge 11 and steam pressure within the steam jacket is indicated by the gauge 12 while temperature is indicated by the thermometer 13. Steam is admitted to the steam jacket through the pipe 14 controlled by the valve 15. A condensation trap 16 is provided at the bottom of the autoclave and with it is associated a by-pass 17.

Gas is admitted to the autoclave through the pipe 18 controlled by the valves 19 and 20. Gas is released from the autoclave by closing the valve 20 and opening the valve 21 in the release pipe 22 having the release nozzle 23.

The stock may be either placed in trays or in molds 24 mounted on racks 25 or on cars 26.

It will be understood that I desire to comprehend within my invention such modifications as come within the scope of the claims and the invention.

Having thus fully described my invention, what I claim as new and desire to secure by Letters Patent is:

1. In a method of sponging rubber, impregnating the stock under gas pressure within a temperature range of from 130° to 160° F. within a closed receptacle as to render the stock plastic so that it can take its subsequent expansion; thereafter releasing the pressure from maximum to zero and maintaining the temperature within said range so as not to permit the stock to lose its plasticity necessary for expansion during the release of the gas.

2. In a method of sponging rubber, the steps of (a) increasing the pressure and raising the temperature to a range between 130° and 160° F. within a closed chamber containing the rubber; (b) impregnating rubber with a gas and simultaneously maintaining the rubber within said temperature range while releasing said gas, and (c) increasing the temperature to vulcanize the rubber after the gas is released.

3. In a method of sponging rubber, the steps of (a) increasing the pressure and raising the temperature to a range between 130° and 160° F. within a closed chamber containing the rubber; (b) impregnating rubber with a gas and simultaneously maintaining the rubber within said temperature range sufficient to bring about impregnation; (c) maintaining said impregnation temperature at substantially constant, and simultaneously releasing the gas to cause sponging of the rubber; and (d) increasing the temperature upon completing the release of the gas so as to vulcanize the rubber in its sponged condition.

4. In a method of sponging rubber, the steps of (a) impregnating rubber stock with gas at atmospheric temperatures; (b) raising the stock to the temperature of 130 to 160 degrees Fahrenheit; (c) holding the stock at substantially a temperature between the foregoing temperatures during the full gas release of the gas from the stock and the resultant expansion of the stock; and (d) thereafter completing the vulcanization of the sponged stock.

5. In a method of sponging rubber, the steps of maintaining rubber stock impregnated with gas in a closed receptacle under a pressure and at a temperature range of from 130° to 160° F, reducing the pressure to atmospheric pressure while maintaining the temperature within said temperature range, and increasing the temperature to vulcanize the rubber after the gas has been released.

6. In a method of sponging rubber, the steps of maintaining rubber stock impregnated with gas in a closed receptacle under a constant pressure and at a temperature range of from 130° to 160° F., reducing the pressure to atmospheric pressure while maintaining the temperature within said temperature range, and increasing the temperature to vulcanize the rubber after the gas has been released.

ALMON J. CORDREY.